United States Patent [19]

Barry et al.

[11] 4,050,034

[45] Sept. 20, 1977

[54] IN CAVITY PUMPING FOR INFRARED LASER

[75] Inventors: James D. Barry, Fairborn; Joseph E. Brandelik, Clark County, both of Ohio

[73] Assignee: The United States of America as represented by the Secretary of the Air Force, Washington, D.C.

[21] Appl. No.: 573,300

[22] Filed: Apr. 30, 1975

[51] Int. Cl.² .................................................. H01S 3/00
[52] U.S. Cl. .......................... 331/94.5 G; 331/94.5 P; 331/94.5 PE
[58] Field of Search ...................... 331/94.5 G, 94.5 P, 331/94.5 PE; 330/4.3

[56] References Cited

U.S. PATENT DOCUMENTS 3,704,428  11/1972  Barry et al. .................... 331/94.5 G

OTHER PUBLICATIONS

Karlov et al., *Radio Engineering & Electronic Physics*, vol. 14, No. 10, 1969, pp. 1650–1652.

*Primary Examiner*—Martin H. Edlow
*Attorney, Agent, or Firm*—Joseph E. Rusz; Richard J. Killoren

[57] ABSTRACT

A far infrared laser having a $CO_2$ laser gas cell located in the same optical cavity as the far infrared cell. The $CO_2$ gas is made to flow through the $CO_2$ cell within the laser cavity and the far infrared gas is made to flow in the far infrared cell within the laser cavity. The current is supplied between a pair of electrodes in the $CO_2$ cell to excite the $CO_2$ gas. The far infrared molecules are pumped by optical energy transfer from the $CO_2$ laser radiation. The infrared radiation is removed by an aperture in one of the mirrors and a far infrared transparent window.

3 Claims, 2 Drawing Figures

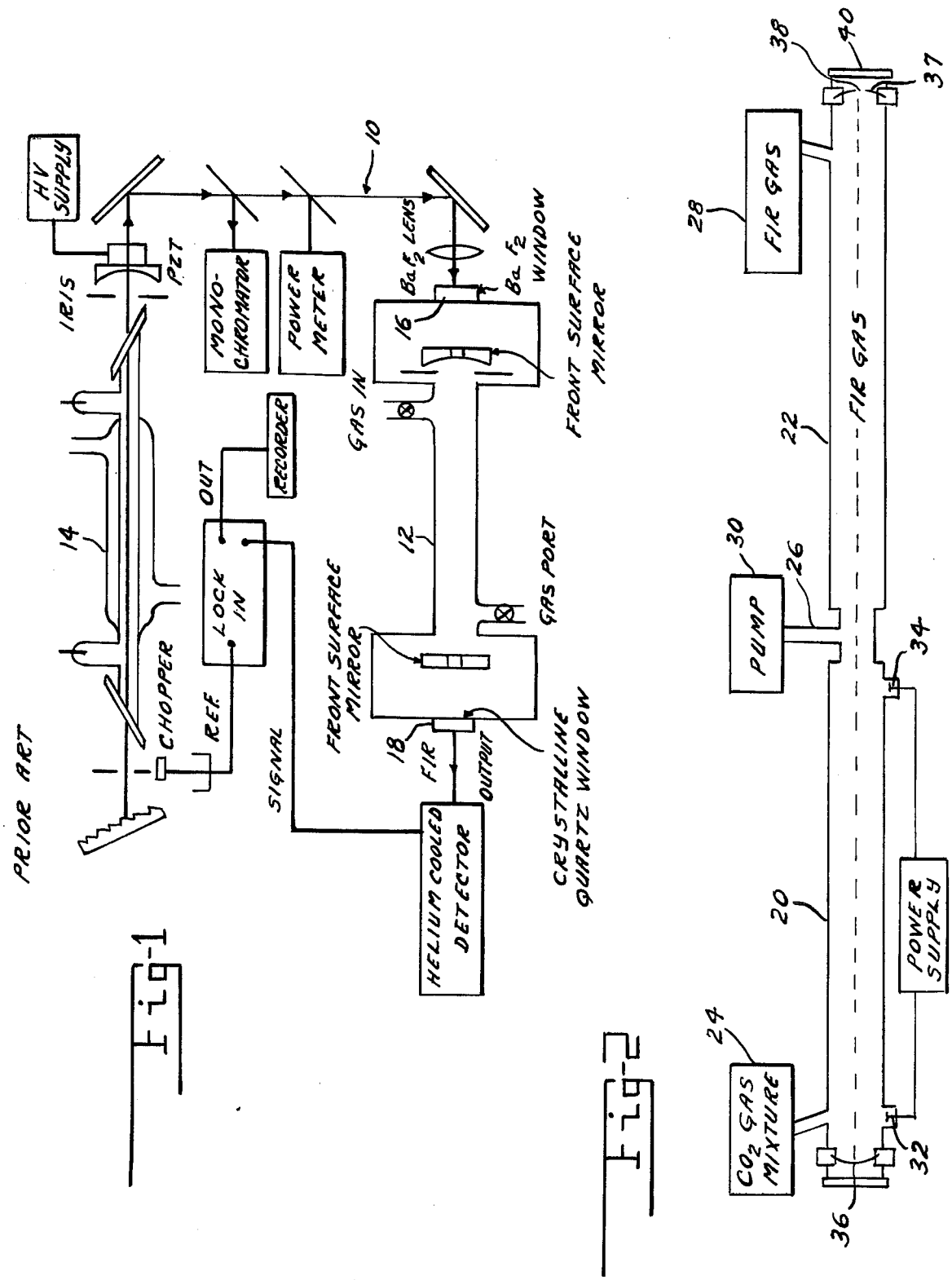

IN CAVITY PUMPING FOR INFRARED LASER

RIGHTS OF THE GOVERNMENT

The invention described herein may be manufactured and used by or for the Government of the United States for all governmental purposes without the payment of any royalty.

BACKGROUND OF THE INVENTION

This invention relates to far infrared (FAR) lasers which are optically pumped by $CO_2$ lasers. Such systems are described in the articles: "c w Submillimeter Laser Action in Optically Pumped Methyl-Fluoride, Methyl Alcohol, and Vinyl Chloride gases" by Chang et al, pp 249–251, in Applied Physics Letters, Volume 17 No 6, Sept. 15, 1970; "Millimeter and Submillimeter Wave Laser Action in Symmetric Top Molecules Optically Pumped via Parallel Absorption Bands." by Chang et al, pp 103–105, in Applied Physics Letter, Volume 19, No. 4, Aug. 15, 1971; "Submillimeter Lasers Optically Pumped Off Resonance" by Fetterman et al, pp 156–159, in Optics Communications, Volume 6, No. 2, Oct. 1972; "New Submillimeter Laser Lines in Optically Pumped Gas Molecules", by Wagner et al, pp 46–47, Volume 8, No. 1, May 1973; "Waveguide Laser for the Far Infrared (FIR) Pumped by a $CO_2$ Laser", by Hodges et al, pp 252–253, in Applied Physics Letters, Volume 23, No 5, Sept. 1, 1973 and "Low-Threshold, C W Submillimeter and Millimeter Wave Laser Action in $CO_2$ Laser Pumped $C_2H_4F_2$, $C_2H_2F_2$, and $CH_3OH$" by Hodges et al, pp 1159–1160, in Journal of Quantum Electronics Volume 9, No 12, Dec. 1973.

In the normal state of the art optically pumped far infrared lasers, the $CO_2$ laser is separate from the far infrared cavity, and the $CO_2$ power is focused into the far infrared cavity to excite the molecules by optical energy transfer. The $CO_2$ power is coupled into the far infrared cavity by means of a hole, in the mirror at one end. A hole in the mirror at the other end is used to extract the far infrared power from the cavity. In such systems, only the $CO_2$ laser energy that enters the far infrared cavity is available for exciting the far infrared molecules.

BRIEF SUMMARY OF THE INVENTION

According to this invention, the $CO_2$ laser is located within the optical cavity for the far infrared laser. The problem of reflective optics is not present here since both the $CO_2$ radiations and the far infrared radiation can be reflected from the same type of mirrors. The far infrared molecules are optically pumped by the resonant circulating $CO_2$ laser radiation within the optical cavity.

IN THE DRAWING

FIG. 1 shows one prior art system for pumping far infrared wavelengths with a $CO_2$ laser.

FIG. 2 shows an in cavity pumping laser system for a far infrared laser according to the invention.

DETAILED DESCRIPTION OF THE INVENTION

Reference is now made to FIG. 1 of the drawing which shows a prior art test apparatus for a far infrared laser system 10 wherein a far infrared laser 12 is optically pumped by the $CO_2$ laser 14. The $CO_2$ energy is coupled into the far infrared laser by means of a Ba $F_2$ window 16 and a crystalline quartz window 18 is used for the extraction of the far infrared energy.

In the system of FIG. 2, according to this invention, the $CO_2$ cell 20 is located in the same optical cavity as the far infrared cell 22. A conventional $CO_2$ gas mixture, such as $CO_2$-He-$N_2$, 13-53-3, circulates through cell 20 from the supply 24 to the output 26. The far infrared gas circulates through the cell 22 from supply 28 to the outlet 26. Both gases may be pumped by a single pump 30.

A current flow between the electrodes 32 and 34 is used to excite the $CO_2$ molecules in a conventional manner. Since the far infrared molecules do not enter the space between the electrodes 32 and 34, dissociation of the far infrared molecules does not become a problem. The $CO_2$ laser radiation flux circulating in the optical cavity between mirrors 36 and 37 excite the far infrared molecules in the far infrared cell 22, by optical energy transfer, in the same manner as in the prior art device of FIG. 1. The mirrors 36 and 37 can be used for both $CO_2$ laser wavelengths and far infrared laser wavelengths provided the mirrors are front coated with a metal, such as copper, silver or aluminum. Some dielectrically coated mirrors could also be used. The far infrared radiation is extracted through aperture 38, in mirror 37, and crystalline quartz window 40 which filters out the $CO_2$ laser wavelengths. Other materials than crystalline quartz may be used for the windows 40. Some of these are given on page 100 of "Methods of Experimental Physics," Volume 10 "Physical Principles of Far-Infrared Radiation" by L. C. Robinson.

By locating the $CO_2$ laser and the far infrared laser in the same optical cavity, the far infrared molecules are pumped by the much larger circulating flux in the $CO_2$ optical cavity than in prior art devices. In this device, the infrared molecules are not pumped by just a portion of the flux produced in the $CO_2$ cell as in prior art devices and some of the losses in the optical system for transmitting the $CO_2$ laser energy to the far infrared laser cell are not present.

With the use of internal mirrors as in the device of FIG. 2, the $CO_2$ laser device is not wavelength selective, so that a great many far infrared wavelengths will be produced. It would be desirable to use external mirrors and also it would be desirable to use a grating as shown in FIG. 1. This, however, would require a window material that would transmit both the $CO_2$ wavelengths and the far infrared wave lengths. In an apparatus built and tested, no such material was available. The materials used for the transmission of $CO_2$ wave lengths were found to absorb too great a portion of the far infrared wave lengths, to permit the device to produce a far infrared output.

Any of the known far infrared molecules where a resonance exists between the $CO_2$ pump radiation wavelengths and the absorbility transition in the far infrared gas molecules can be used. Some of these known in the art are $C_2H_2F_2$, $C_2H_4F_2$, $CH_3OH$, $CH_3Cl$, $CH_3CH_2F$, $CH_3CHF_2$, $CH_3CHF_3$, $CH_3CN$, $CH_3CCN$, $HCOOH$, $NH_3$, $H_2C{:}CHCl$.

While the device shown in FIG. 2 has the $CO_2$ laser gas flowing in a separate cell from the far infrared gas, these could be mixed and supplied to a single cell. However, if the mixed gases were used in a single cell the flow rate of the gas should be increased to minimize the problem of molecular dissociation, by molecular replacement.

There is thus provided a far infrared laser which permits the pumping of the far infrared molecules by the large circulating flux in the $CO_2$ optical cavity.

We claim:

1. A far infrared gas laser, comprising: an optical laser cavity; means for containing lasing gas within said optical laser cavity; said means for containing lasing gas within said optical laser cavity including a first cell in a first portion of said optical laser cavity and a second cell, in another portion of said optical laser cavity, connected to said first cell; said first cell containing far infrared lasing gas molecules; means for providing a flow of $CO_2$ laser gas through said second cell; means for maintaining a separation of said far infrared gas molecules and said $CO_2$ gas; means for electrically exciting the $CO_2$ molecules to provide a population inversion in the $CO_2$ gas to produce intense circulating $CO_2$ laser radiation within said optical laser cavity; said $CO_2$ radiation being absorbed by the far infrared molecules to optically excite the far infrared molecules to produce a population inversion therein to provide a circulating far infrared radiation within said optical cavity; means for extracting far infrared laser energy from said cavity.

2. The device as recited in claim 1 wherein said means for maintaining a separation of said far infrared gas molecules and said $CO_2$ gas includes, means, connected at the junction of said first cell and said second cell, for pumping gas from said first cell and from said second cell; said means for providing a flow of $CO_2$ laser gas through said second cell including means for supplying a $CO_2$ laser gas mixture to the second cell at a position remote from gas pumping means and means for supplying the far infrared gas molecules to said first cell at a position remote from said gas pumping means.

3. The device as recited in claim 2 wherein said far infrared gas molecules are of compounds selected from the group consisting of $C_2H_2F_2$, $C_2H_4F_2$, $CH_3OH$, $CH_3Cl$, $CH_3CH_2F$, $CH_3CHF_2$, $CH_3CHF_3$, $CH_3CN$, $CH_3CCN$, $HCOOH$, $NH_3$ and $H_2C{:}CHCl$.

* * * * *